US012646473B2

(12) United States Patent
Park

(10) Patent No.: US 12,646,473 B2
(45) Date of Patent: Jun. 2, 2026

(54) DISPLAY DEVICE

(71) Applicant: LG DISPLAY CO., LTD., Seoul (KR)

(72) Inventor: SeDong Park, Seoul (KR)

(73) Assignee: LG Display Co., Ltd (KR)

( * ) Notice: Subject to any disclaimer, the term of this patent is extended or adjusted under 35 U.S.C. 154(b) by 2 days.

(21) Appl. No.: 17/966,938

(22) Filed: Oct. 17, 2022

(65) Prior Publication Data

US 2023/0206866 A1 Jun. 29, 2023

(30) Foreign Application Priority Data

Dec. 28, 2021 (KR) ........................ 10-2021-0189418

(51) Int. Cl.
*G09G 3/34* (2006.01)
*G09G 3/20* (2006.01)
(Continued)

(52) U.S. Cl.
CPC ......... *G09G 3/3406* (2013.01); *G09G 3/2096* (2013.01); *G09G 3/36* (2013.01);
(Continued)

(58) Field of Classification Search
CPC ...... G09G 3/3406; G09G 3/34; G09G 3/2096; G09G 3/22; G09G 3/36; G09G 2320/0626;
(Continued)

(56) References Cited

U.S. PATENT DOCUMENTS

2010/0052564 A1* 3/2010 Park .................. H05B 41/2822 315/291
2010/0253696 A1* 10/2010 Choi ................. G02F 1/133615 345/589
(Continued)

FOREIGN PATENT DOCUMENTS

CN 101660692 A 3/2010
CN 102097066 A 6/2011
(Continued)

OTHER PUBLICATIONS

Japanese Office Action dated Nov. 7, 2023 issued in Patent Application No. 2022-169092 w/English Translation (6 pages).
(Continued)

*Primary Examiner* — William Boddie
*Assistant Examiner* — Saifeldin E Elnafia
(74) *Attorney, Agent, or Firm* — Fish & Richardson P.C.

(57) ABSTRACT

A display device includes a backlight unit comprising a plurality of blocks so as to be driven for each divided block, each block including a plurality of light source packages, a display panel disposed above the backlight unit, a controller which outputs local dimming data corresponding to a brightness of some blocks among the plurality of blocks, according to an image displayed on the display panel and a backlight unit (BLU) driver which generates additional local dimming data corresponding to a brightness of each of the remaining blocks adjacent to the some blocks, among the plurality of blocks, using the local dimming data, thus the
(Continued)

same number of LEDs as the related art is used, but more detailed control is possible so that the display quality is improved.

18 Claims, 9 Drawing Sheets

(51) Int. Cl.
*G09G 3/36* (2006.01)
*G09G 5/10* (2006.01)

(52) U.S. Cl.
CPC ............ *G09G 5/10* (2013.01); *G09G 3/3426* (2013.01); *G09G 3/3648* (2013.01); *G09G 2320/0233* (2013.01); *G09G 2320/062* (2013.01); *G09G 2320/0626* (2013.01); *G09G 2320/0646* (2013.01); *G09G 2330/021* (2013.01); *G09G 2360/16* (2013.01)

(58) Field of Classification Search
CPC ..... G09G 2320/0613; G09G 2330/021; G09G 3/3426; G09G 3/3648; G09G 5/10; G09G 2320/0233; G09G 2320/062; G09G 2320/0646; G09G 2360/16
See application file for complete search history.

(56) References Cited

U.S. PATENT DOCUMENTS

| | | | | |
|---|---|---|---|---|
| 2011/0050743 | A1 | 3/2011 | Park et al. | |
| 2011/0122057 | A1 | 5/2011 | Kim et al. | |
| 2011/0141077 | A1* | 6/2011 | Cho | G09G 3/3426 345/207 |
| 2011/0205256 | A1 | 8/2011 | Park et al. | |
| 2011/0249033 | A1* | 10/2011 | Oh | G09G 3/3648 345/690 |
| 2012/0120089 | A1* | 5/2012 | Byun | G09G 3/3406 345/589 |
| 2013/0215161 | A1* | 8/2013 | Cho | G09G 3/3406 345/694 |
| 2019/0232864 | A1* | 8/2019 | Kawakami | G01D 11/28 |

FOREIGN PATENT DOCUMENTS

| | | | |
|---|---|---|---|
| CN | 102576521 | A | 7/2012 |
| CN | 102750930 | A | 10/2012 |
| JP | 2010-044389 | A | 2/2010 |
| JP | 2013-088526 | A | 5/2013 |
| JP | 2013-250505 | A | 12/2013 |
| JP | 2020-154102 | A | 9/2020 |
| KR | 10-0964469 | B1 | 6/2010 |
| KR | 100964467 | B1 | 6/2010 |
| KR | 20110057506 | A | 6/2011 |
| KR | 20110066509 | A | 6/2011 |
| KR | 20130136383 | A | 12/2013 |
| WO | 2011/007438 | A1 | 1/2011 |

OTHER PUBLICATIONS

European Extended Search Report dated May 2, 2023 issued in Patent Application No. 22192577.9 (10 pages).
Office Action in Korean Appln. No. 10-2021-0189418, mailed on May 12, 2025, 16 pages (with English translation).
Office Action in Chinese Appln. No. 202211599743.6, mailed on Nov. 19, 2025, 17 pages (with English translation).

* cited by examiner

DISPLAY DEVICE

CROSS-REFERENCE TO RELATED APPLICATION

This application claims the priority of Korean Patent Application No. 10-2021-0189418 filed on Dec. 28, 2021, which is hereby incorporated by reference in its entirety.

BACKGROUND

Field of the Disclosure

The present disclosure relates to a display device, and more particularly, to a display device using a light emitting diode (LED) as a backlight source.

Description of the Background

A liquid crystal display (LCD) adjusts a light transmittance using an electric field to display an image. Since the LCD is not a self-emitting display device, a backlight unit which supplies light to a rear surface of a liquid crystal display panel is provided.

The backlight unit is largely classified into a direct light type and an edge light type according to a light source placement manner. According to the direct light type, light is irradiated from a plurality of light source packages installed on the rear surface of the LCD onto a liquid crystal panel and according to the edge light type, light is transmitted to the liquid display panel from a plurality of light source packages installed on a side wall of a light guide plate (LGP).

SUMMARY

Accordingly, the present disclosure is to provide a display device which overcomes a selection limitation of an LED driver IC.

The present disclosure is also to provide a display device which performs more precise control using the same number of LEDs.

The present disclosure is not limited to the above-mentioned and other features, which are not mentioned above, can be clearly understood by those skilled in the art from the following descriptions.

In order to achieve one of the above-described features, according to an aspect of the present disclosure, a display device includes a backlight unit comprising a plurality of blocks so as to be driven for each divided block, each block including a plurality of light source packages, a display panel disposed above the backlight unit, a controller which outputs local dimming data corresponding to a brightness of each of some blocks among the plurality of blocks, according to an image displayed on the display panel and a backlight unit (BLU) driver which generates additional local dimming data corresponding to a brightness of each of the remaining blocks adjacent to the some blocks, among the plurality of blocks, using the local dimming data.

Other detailed matters of the exemplary aspects are included in the detailed description and the drawings.

According to the present disclosure, a number of light source packages in the block is reduced and local dimming data which is insufficient in the existing local dimming data is generated and supplemented to overcome the selection limitation of the LED driver IC.

According to the present disclosure, the same number of LEDs as the related art is used, but more detailed control is possible so that the display quality is improved.

The effects according to the present disclosure are not limited to the contents exemplified above, and more various effects are included in the present specification.

BRIEF DESCRIPTION OF THE DRAWINGS

The above and other aspects, features, and other advantages of the present disclosure will be more clearly understood from the following detailed description taken in conjunction with the accompanying drawings, in which.

DETAILED DESCRIPTION

Figure 1:
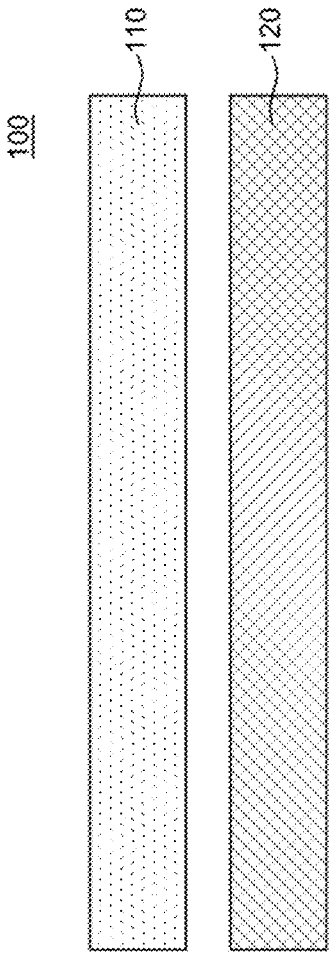
FIG. 1 is a schematic cross-sectional view of a display device according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the exemplary aspects disclosed herein but will be implemented in various forms. The exemplary aspects are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various aspects of the present disclosure can be partially or entirely adhered to or combined with each other and can be interlocked and operated in technically various ways, and the aspects can be carried out independently of or in association with each other.

Hereinafter, various exemplary aspects of the present disclosure will be described in detail with reference to the accompanying drawings.

FIG. 1 is a schematic cross-sectional view of a display device according to an exemplary aspect of the present disclosure.

Referring to FIG. 1, the display device 100 according to an exemplary aspect of the present disclosure may include a display panel 110 and a backlight unit 120 disposed on a rear surface of the display panel 110.

Further, even though it is not illustrated, the display device 100 according to an exemplary aspect of the present disclosure may further include a top case and a cover bottom as a case configuration.

The top case may protect the display panel 110 from the outside. The top case may be disposed to cover an upper edge of the display panel 110 and a side surface of the display panel 110. The top case includes a horizontal portion and a vertical portion. The horizontal portion of the top case encloses an upper edge of the display panel 110 and the vertical portion is disposed to enclose a side surface of the display panel 110 which is enclosed by a guide panel, but are not limited thereto. The top case may be formed of a plastic having a strong strength or a metal material to protect the display panel 110, but is not limited thereto.

The display panel 110 is a panel which displays images. For example, the display panel 110 may be a liquid crystal panel 110 which adjusts a light transmittance of liquid crystals to display images. The liquid crystal panel 110 may include a lower substrate, an upper substrate, and a liquid crystal layer filled between the lower substrate and the upper substrate.

In the lower substrate, a plurality of gate lines and data lines intersect to define pixels. A thin film transistor is provided at each intersection of pixels to be connected to a pixel electrode formed in each pixel.

A common electrode forms an electric field together with the pixel electrode to control the liquid crystals. In accordance with a liquid crystal alignment control method of the liquid crystal layer, the common electrode may be formed on the lower substrate or the upper substrate. For example, when the liquid crystal is controlled in a twisted nematic (TN) mode or a vertical alignment (VA) mode, the common electrode is disposed on the upper substrate and the pixel electrode and the common electrode form a vertical electric field to control the liquid crystal. When the liquid crystal is controlled in a fringe field switching (FFS) mode or an in-plane switching (IPS) mode, the common electrode is disposed on the lower substrate and the pixel electrode and the common electrode form a horizontal electric field to control the liquid crystal.

A color filter and a black matrix may be disposed on the upper substrate. Light emitted from the backlight unit 120 passes through the liquid crystal layer and the color filter between the lower substrate and the upper substrate and may be converted into various color light. The black matrix may conceal the gate lines, the data lines, or the thin film transistors disposed on the lower substrate so as not to be visibly recognized.

A driver may be disposed along one side of the display panel 110 to drive the display panel 110. The driver may include various ICs such as a gate driver IC or a data driver IC and driving circuits. The driver applies a signal to the gate line and the data line to drive the display panel 110. The driver may be electrically connected to the display panel 110 by means of a connection member. For example, the connection member may be configured by a chip on film (COF) or a tape carrier package (TCP), but is not limited thereto.

A guide panel supports the display panel 110 below the display panel 110. Specifically, the guide panel is formed to have a rectangular frame to support the lower edge of the display panel 110. The guide panel may include a vertical portion and a horizontal portion. The vertical portion of the guide panel is disposed so as to enclose a side surface of the display panel to be in contact with the vertical portion of the top case, and the horizontal portion protrudes from the vertical portion to enclose the lower edge of the display panel 110, but are not limited thereto.

The backlight unit 120 may supply light to the display panel 120. The backlight unit 120 may include a plurality of optical sheets, a diffuser, a plurality of light source packages, and a printed circuit board. The backlight unit 120 of FIG. 1 is a direct light type backlight unit so that a plurality of light source packages may be disposed below the display panel 110.

According to the present disclosure, the direct light type backlight unit 120 is configured such that the plurality of light source packages is directed to the display panel 110 so that more light sources may be disposed compared to the edge light type backlight unit. Further, in the direct light type backlight unit 120, the plurality of light source packages 160 may be individually driven.

Therefore, the direct light type backlight unit 120 may implement an excellent contrast ratio through local dimming driving. Further, the direct light type backlight unit 120 may implement a dynamic image with a high luminance through high dynamic range (HDR) driving which increases a contrast ratio of a bright screen and a dark screen, by increasing a luminance of the light source package corresponding to an area where a bright screen is displayed.

The plurality of optical sheets diffuses or condenses light emitted from the plurality of light source packages to allow light having a uniform planar shape to be incident onto the display panel 110. The plurality of optical sheets may include a diffusion sheet and at least one light condensing sheet.

The diffuser may be disposed between the plurality of optical sheets and the plurality of light source packages. The diffuser diffuses light emitted from the plurality of light source packages to allow the light to be incident onto the plurality of optical sheets.

The plurality of light source packages emits white light. Light emitted from the plurality of light source packages passes through the diffuser and the plurality of optical sheets and may be uniformly supplied on the entire surface of the display panel 110. Specifically, the light source package may serve as a surface emitting light source package to uniformly supply light onto the entire surface of the display panel 110. A detailed description of the light source package will be made below with reference to FIG. 2.

A plurality of light source packages may be mounted in the printed circuit board. The printed circuit board is electrically connected to each of the plurality of light source packages to apply a voltage to the light source package.

The cover bottom may accommodate the backlight unit 120. Further, the cover bottom may discharge heat generated in the light source package to the outside. A reflective sheet is attached onto a bottom surface of the cover bottom to reflect light from the light source package to the front.

Figure 2:
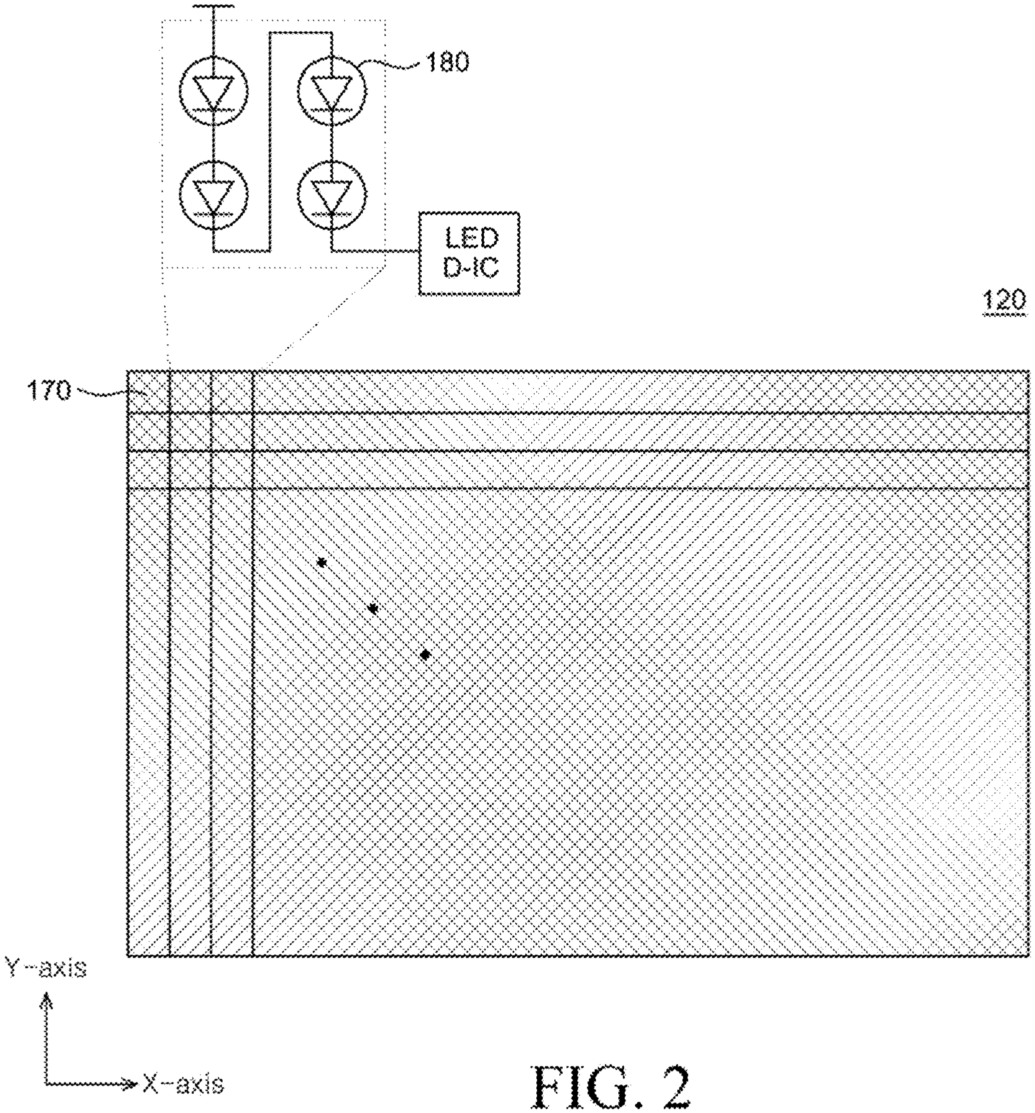
FIG. 2 is a plan view schematically illustrating a backlight unit of FIG. 1.

FIG. 2 is a plan view schematically illustrating a backlight unit of FIG. 1.

FIG. 2 schematically illustrates a placement of the plurality of light source packages 180 in the backlight unit 120 of FIG. 1.

Referring to FIG. 2, the backlight unit 120 is configured by a plurality of blocks 170 and each block 170 includes a plurality of light source packages 180. That is, one block 170 includes a plurality of light source packages 180 and in the backlight unit 120, a plurality of blocks 170 may be disposed in an N×M matrix form (N and M are natural numbers of 1 or larger) in X-axis and Y-axis direction. For example, X-axis and Y-axis may be horizontal axis and vertical axis respectively, as shown in FIG. 2.

Each block 170 is driven as a direct light type backlight and each block 170 operates as one light source so that the plurality of blocks 170 is disposed in a direct light type backlight manner to configure the backlight unit 120.

Therefore, a thickness of the backlight unit 120 is reduced and a number of optical films is reduced to implement slimness of the backlight unit 120.

Specifically, according to an exemplary aspect of the present disclosure, in each block 170, four (=2×2) light source packages 180 are disposed, but it is not limited thereto so that a smaller number of light source packages 180 may be disposed. Accordingly, a total number of blocks may be increased as compared with the related art.

For example, the plurality of blocks 170 is disposed such that 60 blocks are disposed in the X-axis direction and 39 blocks are disposed in the Y-axis direction, respectively. Therefore, a total of 2340 blocks 170 which is more than the related art (~1560 units) may be disposed in a matrix form.

For each block 170, four light source packages 180 are disposed in a 2×2 matrix form and four light source packages 180 may be connected in series. One side of four light source packages 180 connected in series is connected to an anode and the other side may be connected to an LED driver IC.

Further, each block 170 may be manufactured as an independent assembly and disposed to be close to each other to configure a module type backlight unit 120 and supply light to the display panel as a backlight means.

The backlight unit 120 according to an exemplary aspect of the present disclosure may be driven in a full driving manner or a partial driving manner such as local dimming or impulsive. The driving method of the light source package may be changed in various manners depending on a circuit design, but it is not limited thereto.

In the case of the partial driving manner, a contrast ratio is increased and an image for a bright portion and a dark portion of the screen is clearly expressed to improve an image quality. That is, the backlight unit 120 is divided into a plurality of blocks 170 to be driven for each divided block 170 so that luminance of each of the divided blocks 170 is associated with the luminance of the image signal to decrease the luminance of the dark portion and to increase the luminance of the bright portion. By doing this, the contrast ratio and the resolution may be improved.

Further, when the backlight unit 120 is driven by a local dimming method, the display panel may have a plurality of divided regions corresponding to each of the blocks 170 of the backlight unit 120. Further, brightness of light emitted from each of the blocks 170 of the backlight unit 120 may be adjusted according to a luminance level of each of the divided regions of the display panel, for example, a peak value of a gray level or a color coordinate signal.

The backlight unit 120 according to an exemplary aspect of the present disclosure applies the partial driving manner to reduce the power consumption and to save the cost. Further, the backlight unit 120 according to an exemplary aspect of the present disclosure is manufactured by assembling the plurality of blocks 170 so that the process of manufacturing the backlight unit 120 is simple and a loss caused during the assembling process is minimized to improve the productivity. Further, the defects due to scratches on the LGP which may be generated during the assembling process of the backlight unit 120 is reduced and the optical mura is improved, thereby improving the process reliability and to improve the quality.

Further, blocks 170 of the backlight unit 120 according to an exemplary aspect of the present disclosure are standardized to be massively produced so that it is applicable to various sizes of backlight units.

Further, when a defect is generated in any one of the blocks 170 of the backlight unit 120 according to an exemplary aspect of the present disclosure, only the block 170 with the defect may be replaced without replacing the entire backlight unit 120 so that the replacing task is easy and a cost for component replacement is saved.

Further, the backlight unit 120 according to an exemplary aspect of the present disclosure is robust and durable against the external shocks or the environmental changes.

Further, the backlight unit 120 of the exemplary aspect of the present disclosure is easily applied to the large-size display panel and is advantageous in slimness of the display device.

The block 170 is a basic unit to which a driving power is supplied to allow the backlight unit 120, to be more specific, a plurality of light source packages 180 provided in the backlight unit 120 to emit light. The plurality of light source packages 180 included in one block 170 is simultaneously turned on or turned off and may emit light with the same luminance when the light source packages are turned on. Further, the plurality of light source packages 180 included in different blocks 170 of the backlight unit 120 is supplied with different driving powers to emit light having different luminance.

As described above, according to the present disclosure, the number of light source packages 180 in the block 170 is reduced and the same number of light source packages 180 as the related art is used to perform detailed control, thereby improving a display quality.

That is, for example, in the case of a 12.9-inch mini LED backlight unit, a total of six (=2×3) light source packages may be disposed in one block. In this case, 1560 blocks are provided, but the controller may process up to 2048 local dimming data. At this time, the more the light source packages in one block, that is, the number of LEDs, the higher the voltage (~20 V) applied to the anode so that it is limited to select an LED driver IC suitable for the specification.

Therefore, according to the present disclosure, in the 12.9 inch mini LED backlight unit, a total of four (=2×2) light source packages 180 is disposed in one block 170 to reduce the voltage (~14 V) applied to the anode. At this time, for example, 60 blocks 170 are in the X-axis direction and 39 blocks 170 are disposed in the Y-axis direction so that a total of 2340 blocks 170 which is more than the related art are disposed in a matrix form.

Further, the controller generates the same number of local dimming data as the related art and insufficient dimming data is generated and supplemented from adjacent dimming data by the luminance controller. Therefore, according to the present disclosure, the selection limitation of the LED driver IC may be overcome and more blocks 170 are used while using the same number of light source packages 180 as the related art to perform the detailed control, thereby improving the display quality.

Figure 3:
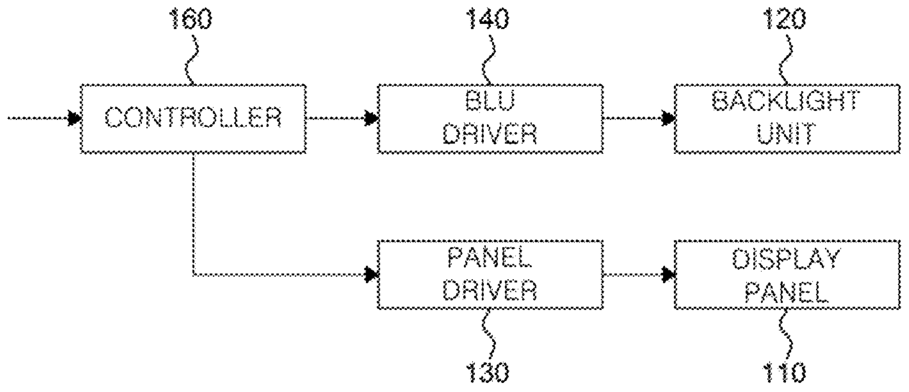
FIG. 3 is a block diagram schematically illustrating a configuration of a display device of FIG. 1.

FIG. 3 is a block diagram schematically illustrating a configuration of a display device of FIG. 1.

Among the configurations of the display device illustrated in FIG. 3, description of the same configuration as described with reference to FIGS. 1 and 2 will be omitted.

Referring to FIG. 3, the display device according to an exemplary aspect of the present disclosure may include a controller 160, a backlight unit (hereinafter, abbreviated as "BLU") driver 140, a panel driver 130, a backlight unit 120, and a display panel 110.

In the display panel 110, an image may be displayed at 60, 120, or 240 frames per second and the larger the number of frames per second, the shorter the scan period of the frame.

At this time, the panel driver 130 receives various control signals and image signals from the controller 160 to generate a driving signal to drive the display panel 110 and to supply the generated driving signal to the display panel 110. For example, the panel driver 130 may be configured to include a gate driver connected to a gate line of the display panel 110, a data driver connected to a data line, and a timing controller which controls the gate driver and the data driver.

In the meantime, the controller 160 may output a local dimming value according to the image signal to the BLU driver 140 to control luminance of the backlight unit 120, that is, the light source packages included in the backlight unit 120, corresponding to the image signal.

Further, the controller 160 may provide information about a scan period in which one frame is displayed on the display panel 110, for example, a vertical synchronization signal, to the BLU driver 140.

At this time, the BLU driver 140 drives light source packages included in the backlight unit 120 according to the input scan period to control the light source packages to emit light in synchronization with the displaying of the image on the display panel 110.

In the meantime, each of light source packages included in the backlight unit 120 may include a plurality of point light sources, for example, light emitting diodes (LED) and the plurality of point light sources included in one block may be simultaneously turned on or turned off.

In the meantime, according to an exemplary aspect of the present disclosure, the plurality of light source packages provided in the backlight unit 120 is divided into a plurality of blocks by the division driving manner, such as local dimming. Further, the luminance of the light source packages belonging to each block may be adjusted according to a luminance level of a display panel 110 region corresponding to each divided block, for example, a gray level peak value or a color coordinate signal.

For example, when an image is displayed in a first area of the display panel 110 and the image is not displayed in a second area to be displayed with black, the BLU driver 140 may control the light source packages included in the backlight unit 120. Therefore, the light source packages belonging to a block corresponding to the second area, among the divided blocks, emit light with a luminance lower than that of the light source packages belonging to the block corresponding to the first area.

In the meantime, light source packages belonging to the block of the backlight unit 120 corresponding to the second area of the display screen of the display panel 110 in which the image is not displayed and black is displayed may be turned off so that the power consumption of the display device may be further reduced.

The controller 160 generates a local dimming value corresponding to a brightness of each block of the backlight unit 120 according to a luminance level of an input image signal, for example, a luminance level of the entire image or a luminance level of a specific region. That is, the controller 160 generates a local dimming value for each block to output the local dimming value to the BLU driver 140. The BLU driver 140 may control brightness of each block of the backlight unit 120 using an input local dimming value for every block.

As described above, according to the present disclosure, the number of light source packages disposed in one block is reduced so that the total number of blocks for the same number of the light source packages is increased so that the number of local dimming data required for the BLU driver 140 may be insufficient. Accordingly, according to an aspect of the present disclosure, the insufficient local diming data is generated and supplemented from adjacent local dimming data by means of the luminance controller of the BLU driver 140.

Hereinafter, a luminance control method of a display device according to an exemplary aspect of the present disclosure will be described in more detail with reference to FIGS. 4 to 8A and 8B.

Figure 4:
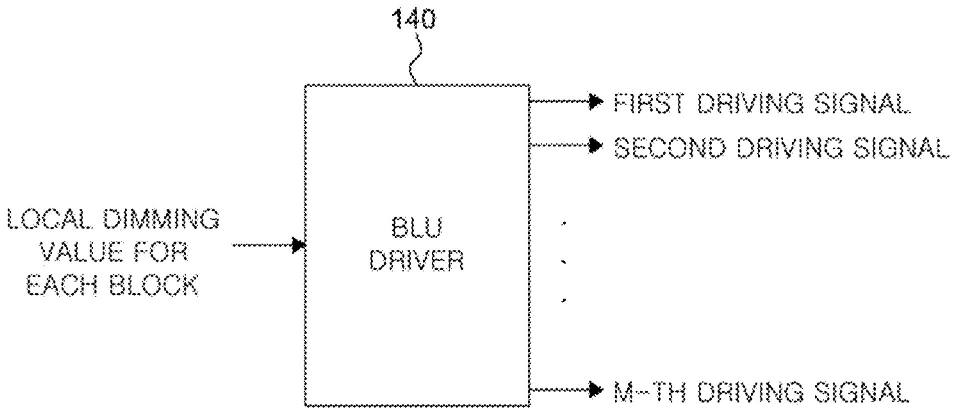
FIG. 4 is a block diagram schematically illustrating a configuration of a backlight driver.

FIG. 4 is a block diagram schematically illustrating a configuration of a backlight driver.

Figure 5:
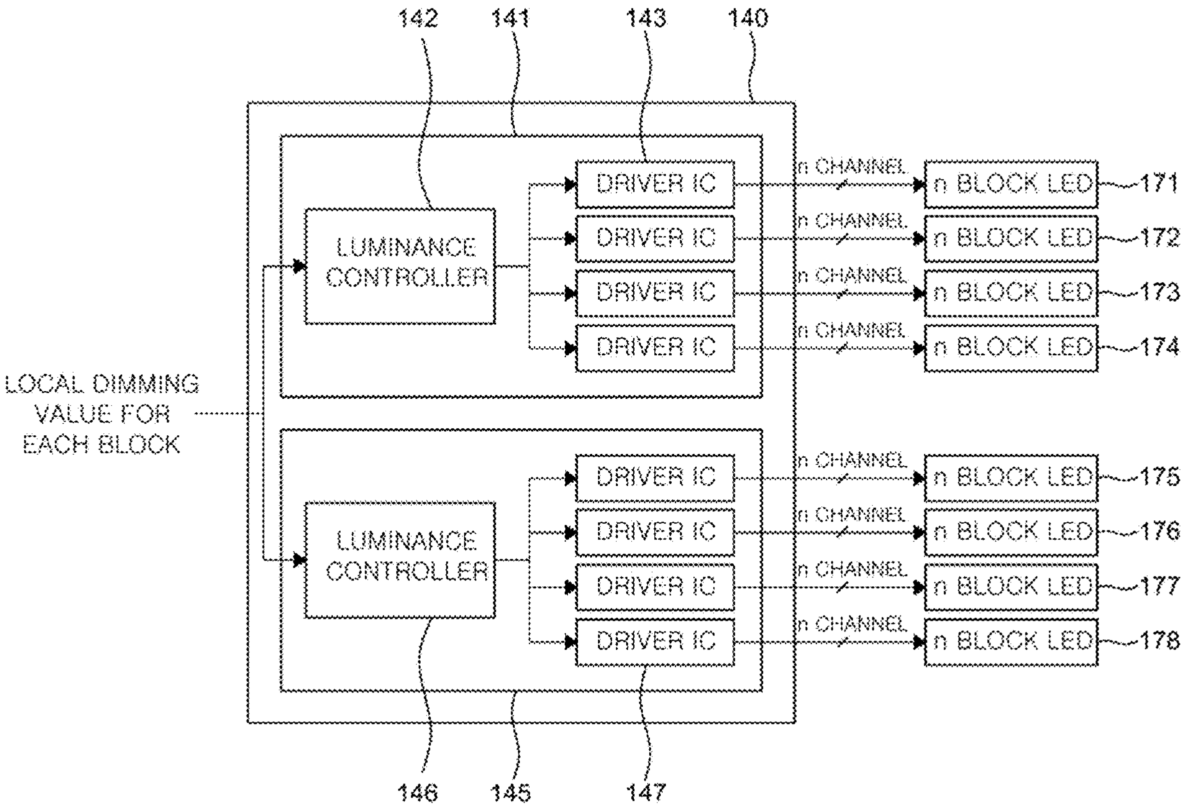
FIG. 5 is a block diagram more specifically illustrating a configuration of a backlight driver.

FIG. 5 is a block diagram more specifically illustrating a configuration of a backlight driver.

Among the configurations of the display device illustrated in FIGS. 4 and 5, description of the same configuration as described with reference to FIGS. 1 to 3 will be omitted.

First, referring to FIG. 4, the BLU driver 140 receives a local dimming value for each block which represents the brightness of each divided block of a backlight unit from the controller and may output a plurality of driving signals, for example, first to m-th driving signals using the received local dimming value for each block.

That is, the controller divides an area of the image for the input RGB image signal, into a plurality of areas and may provide information about a luminance level of the image, that is, a local dimming value, to the luminance controller of the BLU driver 140 to determine a brightness of the light sources belonging to the block of the backlight unit corresponding to each region.

The information about the luminance level of the image provided from the controller to the luminance controller includes not only an average luminance level (average block level, ABL) of a region corresponding to a block whose brightness needs to be determined, but also an average luminance level (average picture level, APL) of the other region adjacent thereto or an entire region of the image. However, it is not limited thereto.

That is, the controller divides an image of one frame into a plurality of regions and may provide not only an average luminance level for a first divided region, but also information about an average luminance level for the other region adjacent to the first area, to the luminance controller. Further, when the luminance controller determines a brightness of a specific block of the backlight unit, the controller may provide corresponding information to use information about the average luminance level of the entire image.

According to the exemplary aspect of the present disclosure, a look-up table which determines a brightness of a specific block of the backlight unit according to an average luminance level of the entire measured image or a partial region needs to be provided. The luminance controller reads and outputs a brightness of a light source corresponding to the average luminance level measured by the controller, from the look-up table.

For example, when an average luminance level of the entire image is equal to or higher than a predetermined value "B", the entire image needs to be expressed with a bright gray scale level and a brightness of a corresponding block of the backlight unit may be determined. In this case, an image to be displayed on the display panel is entirely bright so that the darkening of the screen is not a problem while maximizing a local dimming effect of the backlight unit. In other words, when the image needs to be expressed at a bright grayscale level as a whole, the higher the average luminance level measured for each of the divided region of the image, the higher the brightness of the corresponding block, and the lower the average luminance level of the divided region, the lower the brightness of the block.

In the meantime, when the image needs to be expressed at a dark gray scale level as a whole, that is, an average luminance level of the entire image is below the value "A", the local dimming may be performed only on a divided region having an average luminance level lower than a predetermined luminance value. That is, a proposed look-up table may be set to perform the local dimming that the brightness of the light source package is changed only for the divided region having an average luminance level lower than a predetermined luminance value. This is because, when the image is an entirely dark image, if the brightness of the light source is determined according to a local dimming graph, the brightness of the image is too dark so that the color gamut is rather deteriorated.

Accordingly, when the luminance level of the entire image is low, the local dimming may not be performed on divided regions having an average luminance level which is higher than or equal to a predetermined brightness.

When the average luminance level of the entire image is located between the value "A" and the value "B", if the average luminance level of the measured divided region is higher than a predetermined value, the brightness change of the light source package is set to be small. Further, if the average luminance level of the divided region is lower than a predetermined value, the brightness changes of the light source package may be set to be large. That is, the local dimming value corresponding to the light source is set to be low for the divided regions having a brightness gray scale level and the local dimming value corresponding to the light source may be set to be relatively high for the divided regions having a lower gray scale level.

In the meantime, each of the plurality of driving signals output from the BLU driver 140 may control the brightness of two or more blocks among the divided blocks of the backlight unit.

That is, the BLU driver 140 generates a first driving signal to control the brightness of n blocks among the blocks of the backlight unit, for example, first to n-th blocks, to supply the first driving signal to light source packages belonging to the first to n-th blocks. To this end, the first driving signal may be generated using local dimming values corresponding to the first to n-th blocks, among the local dimming values for each block input from the controller.

According to the exemplary aspect of the present disclosure, the controller and the BLU driver 140 may transmit and receive signals using a serial peripheral interface (SPI) communication.

That is, the BLU driver 140 may receive a local dimming value for each block from the controller using the SPI communication.

Further, referring to FIG. 5, the BLU driver 140 may be configured to include a plurality of driving units 141 and 145, and each of the plurality of driving units 141 and 145 may include luminance controllers 142 and 146 and a plurality of driver ICs 143 and 147.

For example, the luminance controllers 142 and 146 may be configured by a field programmable gate array (FPGA), but are not limited thereto.

FPGA is a semiconductor device including a designable logic element and a programmable internal circuit. The designable logic element may be programmed by replicating a function of AND, OR, XOR, NOT, a more complex decoder, or a basic logic gate. Most FPGA includes a memory element configured by a simple flip-flop or more complete memory block in a programmable logic element.

At this time, for example, the first driving unit 141 includes a first luminance controller 142 and a plurality of driver ICs 143, and the first luminance controller 142 receives local dimming values for each block from the controller in series and outputs the input local dimming values in parallel to transmit the local dimming values of corresponding blocks to each of the plurality of driver ICs 143.

In the meantime, each of the plurality of driver ICs 143 controls the brightness of n blocks among divided blocks of the backlight unit and to this end, may output a driving signal for controlling brightness of n blocks to each of n block LEDs 171, 172, 173, and 174 using n channels.

For example, the first driving unit 141 may include four driver ICs 143 and each of four driver ICs 143 outputs the driving signal using 16 channels to control the brightness of the light source packages belonging to 16 blocks. Therefore, the first driving unit 141 may control the brightness of 64 (=4×16) divided blocks of the backlight unit, but the present disclosure is not limited thereto.

Further, for example, the second driving unit 145 includes a second luminance controller 146 and a plurality of driver ICs 147. The second luminance controller 146 receives a local dimming value for each block from the controller in series to output the local dimming value in parallel to transmit the local diming values of the corresponding blocks to each of the plurality of driver ICs 147.

In the meantime, each of the plurality of driver ICs 147 may control the brightness of n blocks among divided blocks of the backlight unit and to this end, may output a driving signal for controlling brightness of n blocks to each of n block LEDs 175, 176, 177, and 178 using n channels.

The configuration of the BLU driver 140 illustrated in FIGS. 4 and 5 is just an exemplary aspect according to the present disclosure so that the display device according to the present disclosure is not limited to the configuration illustrated in FIGS. 4 and 5. That is, the BLU driver 140 may be configured to include three or more driving units and the number of blocks of the backlight unit which controls the brightness of each driving unit may vary.

In the meantime, as described above, according to the present disclosure, the insufficient local diming data is generated and supplemented from adjacent local dimming data by means of the luminance controllers 142 and 146 of the BLU driver 140.

Figure 6A:
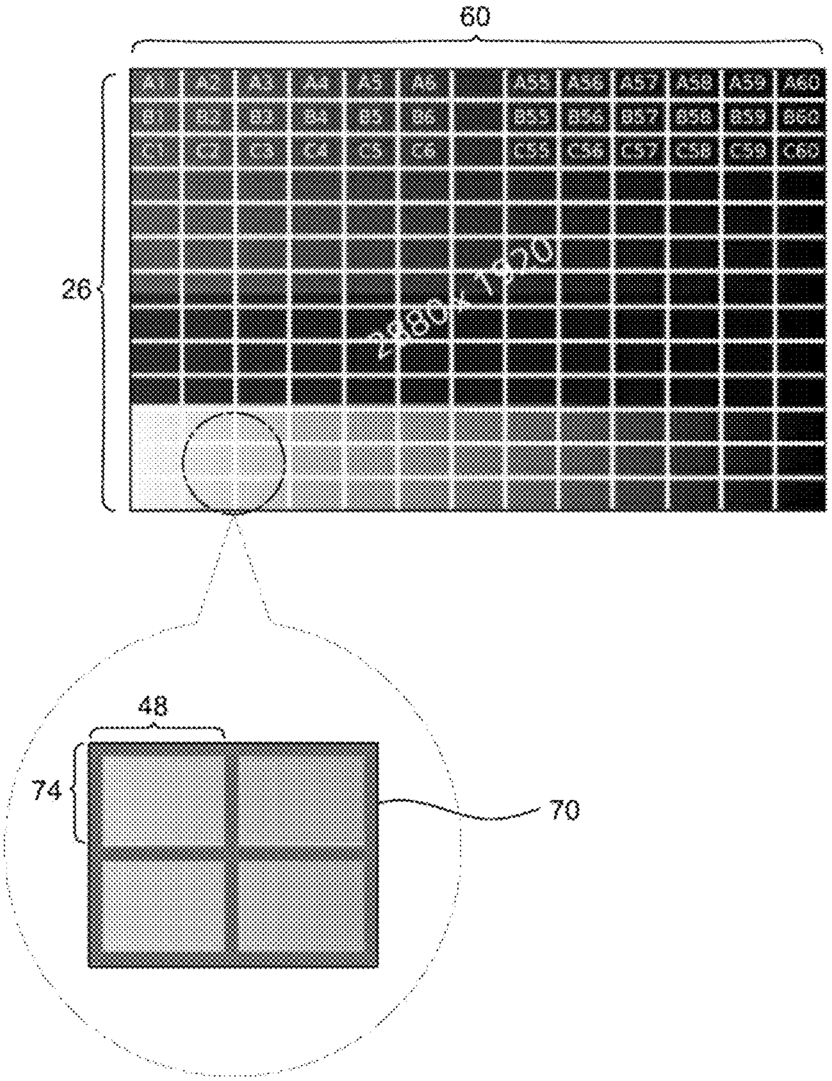
FIG. 6A is a view schematically illustrating a block placement of a comparative example.

FIG. 6A is a view schematically illustrating a block placement of a comparative example.

Figure 6B:
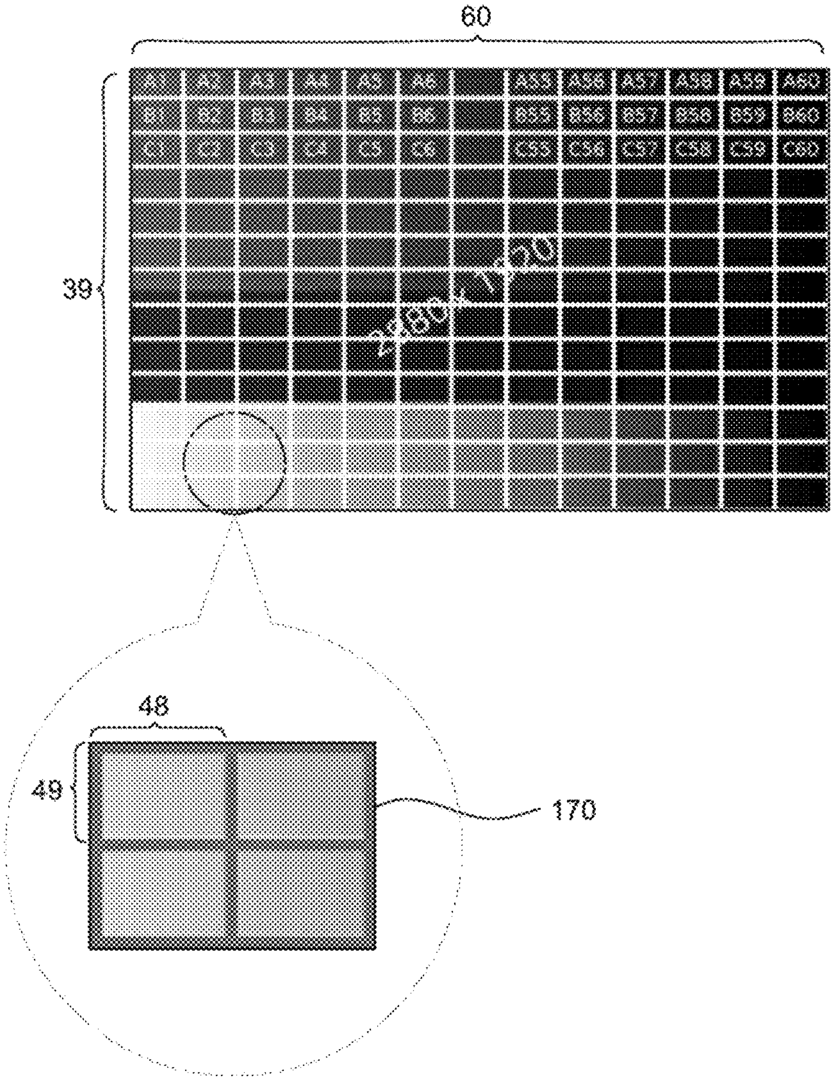
FIG. 6B is a view schematically illustrating a block placement of an exemplary aspect.

FIG. 6B is a view schematically illustrating a block placement of an exemplary aspect.

Figure 7A:
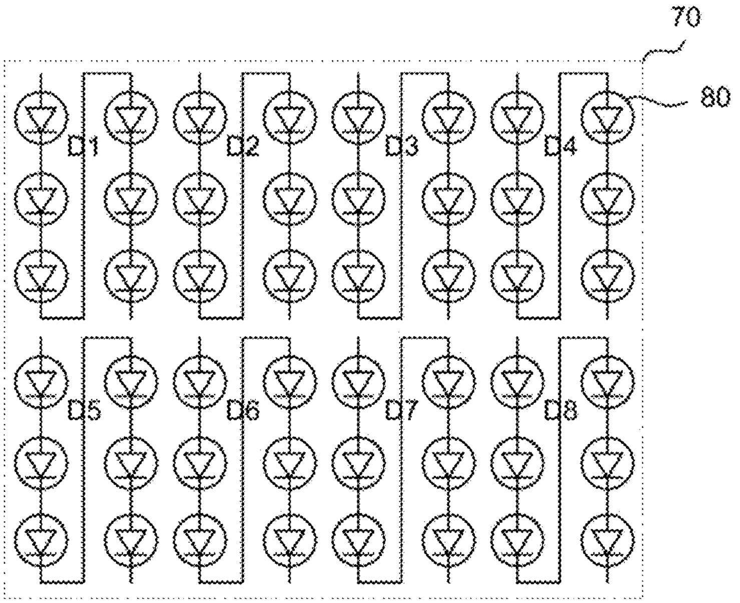
FIG. 7A is a view illustrating a part of a placement of a light source package of a comparative example.

FIG. 7A is a view illustrating a part of a placement of a light source package of a comparative example.

Figure 7B:
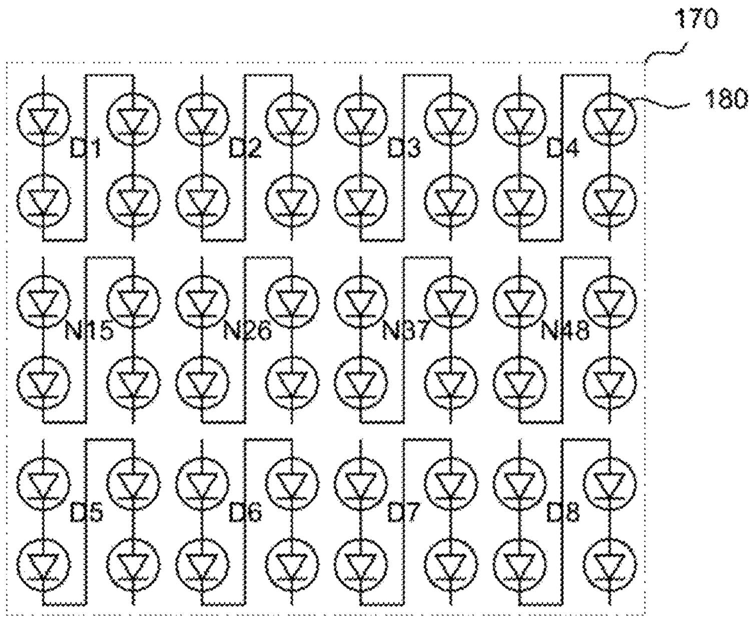
FIG. 7B is a view illustrating a part of a placement of a light source package of an exemplary aspect.

FIG. 7B is a view illustrating a part of a placement of a light source package of an exemplary aspect.

Figure 8:
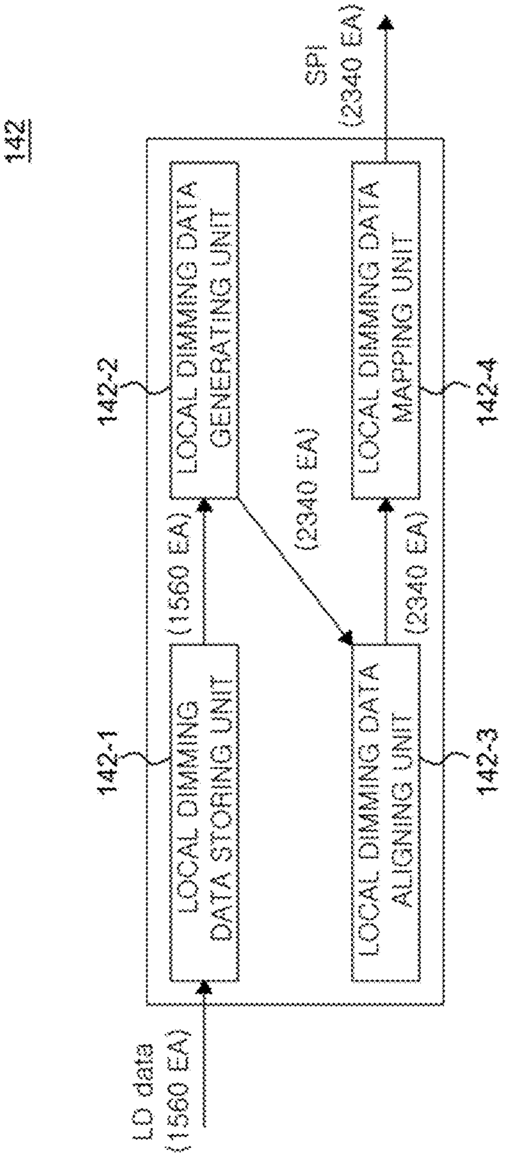
FIG. 8 is a block diagram schematically illustrating a configuration of a luminance controller of FIG. 5.

FIG. 8 is a block diagram schematically illustrating a configuration of a luminance controller of FIG. 5.

Hereinafter, for the convenience of description, 12.9 inch mini LED model is used as an example to be compared with a comparative example.

Referring to FIGS. 6A and 7A, in a backlight unit of the comparative example, a plurality of blocks 70 is disposed in a 60 by 26 matrix form in X-axis and Y-axis direction.

That is, the backlight unit of the comparative example is configured by a total of 1560 blocks 70.

In each block 70, six (=2×3) light source packages 80 are disposed.

In a display panel of the comparative example which is opposite to the backlight unit, 2580×1920 pixels are disposed in a matrix form. That is, a panel resolution of the comparative example is 2580×1920.

Accordingly, in the case of the comparative example, in one block 70, 3552 (=48×74) sub pixels may be correspondingly disposed.

In contrast, referring to FIGS. 6B and 7B, in a backlight unit of the exemplary aspect, a plurality of blocks 170 is disposed in a 60 by 39 matrix form in X-axis and Y-axis direction.

That is, the backlight unit of the exemplary aspect is configured by a total of 2340 blocks 170.

In each block 170, four (=2×2) light source packages 180 are disposed.

In a display panel of the exemplary aspect, which is opposite to the backlight unit, 2580×1920 sub pixels are disposed in a matrix form. That is, a panel resolution of the exemplary aspect is 2580×1920, which is equal to the comparative example.

Accordingly, in the exemplary aspect, in one block 170, 2352 (=48×49) sub pixels may be correspondingly disposed. That is, in the exemplary aspect, a smaller number of sub pixels than that of the comparative example is correspondingly disposed in one block 170 so that more detailed control is possible to improve a display quality.

Further, according to an exemplary aspect, the number of blocks 170 is larger than that of the comparative example, so that a halo issue which is the blurring phenomenon may be improved.

As described in the comparative example, the more the light source packages 80 in one block 70, the higher the voltage (~20 V) applied to the anode so that it may be limited to select an LED driver IC suitable for the specification. In contrast, as described in the exemplary aspect, when a total of four (=2×2) light source packages 180 is disposed in one block 170 to reduce a voltage (~14 V) applied to the anode, the limitation in selection of the LED driver IC may be overcome.

In the meantime, the controller generates the local dimming data and the luminance controller performs data mapping and serial peripheral interface (SPI) conversion to transmit the signal to the LED driver IC.

In the case of the comparative example, the controller generates 1560 local dimming data to transmit the generated local dimming data to a microcontroller unit (hereinafter, abbreviated as MCU) and the MCU performs the mapping of the received 1560 local dimming data and SPI conversion to transmit the signal to the LED driver IC. The LED driver IC is controlled to be on/off in the unit of blocks in accordance with the local dimming data.

At this time, some controller may process up to 2048 (64 in a horizontal direction and 23 in a vertical direction) block data. Accordingly, in the comparative example, the data may be processed, but in the exemplary aspect, some controller may not process.

Therefore, according to an exemplary aspect, the controller generates 1560 local dimming data to transmit the generated local dimming data to the FPGA, for example. The FPGA additionally generates new local dimming data to a total of 1560 local dimming data to perform the mapping and SPI conversion of the total of 2340 local dimming data to transmit the data to the LED driver IC. The LED driver IC controls on/off in the unit of blocks in accordance with the local dimming data.

Next, referring to FIG. 8, for example, the first luminance controller 142 according to an exemplary aspect of the present disclosure includes a local dimming data storing unit 142-1, a local dimming data generating unit 142-2, a local dimming data aligning unit 142-3, and a local dimming data mapping unit 142-4.

The local dimming data storing unit 142-1 may store local dimming data LD data for each block which is sequentially input from the controller.

For example, the local dimming data storing unit 142-1 according to an exemplary aspect of the present disclosure stores 1560 local dimming data input from the controller.

The local dimming data storing unit 142-1 may be a line memory type, but is not limited thereto.

At this time, only 1560 local dimming data is input from the controller so that 780 local dimming data corresponding to the number of increased block is insufficient.

Accordingly, in the exemplary aspect of the present disclosure, 780 local dimming data may be generated by the local dimming data generating unit 142-2 using 1560 adjacent (neighboring) local dimming data.

Referring to FIG. 7B together, for example, among the plurality of blocks 170 disposed in 4 by 3, the local dimming data may be provided to a first row block 170 and a third row block 170. At this time, for the convenience of description, the horizontal direction is defined as a row and the vertical direction is defined as a column, but it is not limited thereto.

For example, when the local dimming data values of the first row block 170 are sequentially D1, D2, D3, and D4 and the local dimming data values of the third row block 170 are D5, D6, D7, and D8, the local dimming data values of the second row block 170 are sequentially N15, N26, N37, and N48.

The local dimming data values N15, N26, N37, and N48 of the second row block 170 may be generated using the local dimming data values of adjacent blocks.

That is, for example, the local dimming data values N15, N26, N37, and N48 of the second row block 170 may be newly generated using the local dimming data values D1, D2, D3, and D4 of the first row block 170 and the local dimming data values D5, D6, D7, and D8 of the third row block 170.

For example, the new local dimming data values N15, N26, N37, and N48 of the second row block 170 may be generated using a mean, min padding or max padding, or sigmoid function for the local dimming data values D1, D2, D3, D4 of the adjacent first row block 170 and the local dimming data values D5, D6, D7, and D8 of the third row block 170.

When the mean is used, the local dimming data values N15, N26, N37, and N48 of the second row block 170 may be generated by N15=(D1+D5)/2, N26=(D2+D6)/2, N37=(D3+D7)/2, and N48=(D4+D8)/2, respectively.

When the min padding method is used, the local dimming data values N15, N26, N37, and N48 of the second row block 170 may be generated by N15=min(D1, D5), N26=min(D2, D6), N37=min(D3, D7), and N48=min(D4, D8), respectively.

When the max padding method is used, the local dimming data values N15, N26, N37, and N48 of the second row block 170 may be generated by N15=max(D1, D5), N26=max(D2, D6), N37=max(D3, D7), and N48=max(D4, D8), respectively.

When the sigmoid function is used, the local dimming data values N15, N26, N38, and N48 are generated by N15=sigmoid(min(D1, D5), max(D1, D5), sigma), N26=sigmoid(min(D2, D6), max(D2, D6), sigma), N37=sigmoid(min(D3, D7), max(D3, D7), sigma), and N48=sigmoid(min(D4, D8), max(D4, D8), sigma), respectively.

Referring to FIG. 8, the newly generated 780 local dimming data is aligned by the local dimming data aligning unit 142-3 to be stored in the local dimming data storing unit 142-1 together with existing 1560 local dimming data.

However, the present disclosure is not limited thereto and the 780 local dimming data aligned by the local dimming data aligning unit 142-3 may be stored in a new local dimming data storing unit together with existing 1560 local dimming data.

A total of 2340 local dimming data stored in the local dimming data storing unit 142-1 is mapped and SPI-converted by the local dimming data mapping unit 142-4 to be transmitted to the LED driver IC of each block.

The exemplary aspects of the present disclosure can also be described as follows:

According to an aspect of the present disclosure, there is provided a display device. The display device includes a backlight unit comprising a plurality of blocks so as to be driven for each divided block, each block including a plurality of light source packages, a display panel disposed above the backlight unit, a controller which outputs local dimming data corresponding to a brightness of each of some blocks among the plurality of blocks, according to an image displayed on the display panel and a backlight unit (BLU) driver which generates additional local dimming data corresponding to a brightness of each of the remaining blocks adjacent to the some blocks, among the plurality of blocks, using the local dimming data.

The BLU driver may include a plurality of driving units, and the driving unit may include a luminance controller which receives the local dimming data from the controller and a plurality of driver ICs which outputs the local dimming data and the additional local dimming data.

The luminance controller may output the local dimming data and the additional local dimming data input in serial in parallel to transmit the respective local dimming data and the additional local dimming data to each of the plurality of driver ICs.

The luminance controller may be configured by a field programmable gate array (FPGA).

Each block may include four light source packages.

the luminance controller includes a local dimming data storing unit, a local dimming data generating unit, a local dimming data aligning unit and a local dimming data mapping unit.

The local dimming data storing unit may store the local dimming data which is sequentially input from the controller.

The local dimming data generating unit may generate the additional local dimming data using the local dimming data.

The local dimming data aligning unit may align the local dimming data and the additional local dimming data.

The local dimming data storing unit may store the local dimming data and the additional local dimming data which are aligned by the local dimming data aligning unit.

The local dimming data mapping unit may map and serial peripheral interface (SPI)-convert the local dimming data and the additional local dimming data stored in the local dimming data storing unit to transmit the data to an LED driver IC of each block.

The plurality of blocks may be disposed in an N×M matrix form (N and M are natural numbers of 1 or larger), the local dimming data may refer to local dimming data in an odd-numbered row corresponding to the brightness of each block in the odd-numbered row, and the additional local dimming data may refer to local dimming data in an even-numbered row corresponding to the brightness of each block in the even-numbered row adjacent to the odd-numbered row.

The local dimming data generating unit may generate the local dimming data in the even-numbered row using the local dimming data in the adjacent odd-numbered rows.

The local dimming data generating unit may generate the local dimming data in the even-numbered row with a mean of the local dimming data in the adjacent odd-numbered rows.

The local dimming data generating unit may generate the local dimming data in the even-numbered row with a minimum value of the local dimming data in the adjacent odd-numbered rows.

The local dimming data generating unit may generate the local dimming data in the even-numbered row with a maximum value of the local dimming data in the adjacent odd-numbered rows.

The local dimming data aligning unit may align the local dimming data in the odd-numbered row and the local dimming data in the even-numbered row.

The local dimming data storing unit may store the local dimming data in the odd-numbered row and the local dimming data in the even-numbered row which are aligned by the local dimming data aligning unit.

The local dimming data mapping unit may map and serial peripheral interface (SPI)-convert the local dimming data in the odd-numbered row and the local dimming data in the even-numbered row stored in the local dimming data storing unit to transmit the data to an LED driver IC of each block.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a backlight unit comprising a plurality of blocks including first, second and third rows of blocks, each block including a plurality of light source packages;

a display panel disposed above the backlight unit;

a controller which outputs local dimming data corresponding to a brightness of the first and third row blocks in one frame, according to an image displayed on the display panel and does not output the local dimming data corresponding to a brightness of a second row block disposed between the first and third row blocks in the one frame; and a backlight unit (BLU) driver including a plurality of driving units, and wherein each of the plurality of driving units includes (i) a luminance controller receiving the local dimming data corresponding to the brightness of the first and third row blocks from the controller, without receiving the local dimming data corresponding to the brightness of the second row block, and generating additional local dimming data corresponding to a brightness of the second row block in the one frame using the received local dimming data corresponding to the brightness of the first and third row blocks in the one frame, and (ii) a plurality of driver ICs outputting the received local dimming data and the generated additional local dimming data, and wherein for each block, the plurality of light source packages are connected in series and one end of the plurality of light source packages connected in series is connected to an anode and the other end of the plurality of light source packages is connected to each driver IC.

2. The display device according to claim 1, wherein the luminance controller receives the local dimming data in serial and outputs the local dimming data and the additional local dimming data in parallel to transmit the respective local dimming data and the additional local dimming data to each of the plurality of driver ICs.

3. The display device according to claim 1, wherein the luminance controller is configured by a field programmable gate array (FPGA).

4. The display device according to claim 1, wherein each block includes four light source packages.

5. The display device according to claim 1, wherein the luminance controller includes:

a local dimming data storing unit;

a local dimming data generating unit;

a local dimming data aligning unit; and a local dimming data mapping unit.

6. The display device according to claim 5, wherein the local dimming data storing unit stores the local dimming data which is sequentially input from the controller.

7. The display device according to claim 5, wherein the local dimming data generating unit generates the additional local dimming data using the local dimming data.

8. The display device according to claim 5, wherein the local dimming data aligning unit aligns the local dimming data and the additional local dimming data.

9. The display device according to claim 8, wherein the local dimming data storing unit stores the local dimming data and the additional local dimming data which are aligned by the local dimming data aligning unit.

10. The display device according to claim 9, wherein the local dimming data mapping unit maps and serial peripheral interface (SPI)-converts the local dimming data and the additional local dimming data stored in the local dimming data storing unit to transmit the data to an LED driver IC of each block.

11. The display device according to claim 5, wherein the plurality of blocks is disposed in an N×M matrix form (N and M are natural numbers of 1 or larger), wherein the local dimming data refers to local dimming data in an odd-numbered row corresponding to the brightness of each block in the odd-numbered row, and wherein the additional local dimming data refers to local dimming data in an even-numbered row corresponding to the brightness of each block in the even-numbered row adjacent to the odd-numbered row.

12. The display device according to claim 11, wherein the local dimming data generating unit generates the local dimming data in the even-numbered row using the local dimming data in the adjacent odd-numbered rows.

13. The display device according to claim 12, wherein the local dimming data generating unit generates the local dimming data in the even-numbered row with a mean of the local dimming data in the adjacent odd-numbered rows.

14. The display device according to claim 12, wherein the local dimming data generating unit generates the local dimming data in the even-numbered row with a minimum value of the local dimming data in the adjacent odd-numbered rows.

15. The display device according to claim 12, wherein the local dimming data generating unit generates the local dimming data in the even-numbered row with a maximum value of the local dimming data in the adjacent odd-numbered rows.

16. The display device according to claim 12, wherein the local dimming data aligning unit aligns the local dimming data in the odd-numbered row and the local dimming data in the even-numbered row.

17. The display device according to claim 16, wherein the local dimming data storing unit stores the local dimming data in the odd-numbered row and the local dimming data in the even-numbered row which are aligned by the local dimming data aligning unit.

18. The display device according to claim 17, wherein the local dimming data mapping unit maps and serial peripheral interface (SPI)-converts the local dimming data in the odd-numbered row and the local dimming data in the even-numbered row stored in the local dimming data storing unit to transmit the data to an LED driver IC of each block.

* * * * *